US012737812B2

(12) United States Patent
Singh et al.

(10) Patent No.: US 12,737,812 B2
(45) Date of Patent: Sep. 15, 2026

(54) TRUSTED INDUSTRIAL ASSET MONETIZATION USING PRIVILEGED FRACTIONAL NFTs FOR PRIVATE GENERATIVE AI KNOWLEDGE EXTRACTION

(71) Applicant: HITACHI, Ltd., Tokyo (JP)

(72) Inventors: Prasun Kumar Singh, San Jose, CA (US); Ravigopal Vennelakanti, San Jose, CA (US); Malarvizhi Sankaranarayanasamy, Mountain View, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 19/023,208

(22) Filed: Jan. 15, 2025

(65) Prior Publication Data

US 2026/0203818 A1 Jul. 16, 2026

(51) Int. Cl.
*G06Q 40/06* (2012.01)

(52) U.S. Cl.
CPC ......... *G06Q 40/06* (2013.01); *G06Q 2220/00* (2013.01)

(58) Field of Classification Search
None
See application file for complete search history.

(56) References Cited

U.S. PATENT DOCUMENTS 10,983,958 B1 4/2021 Miller et al.
11,086,289 B2 8/2021 Dean et al.
11,257,050 B2 * 2/2022 Asver .................. G06Q 20/367
11,551,212 B2 1/2023 Malhotra et al.
11,720,888 B2 8/2023 Norton et al.
12,437,306 B2 * 10/2025 Xie ...................... G06Q 30/018
2020/0311816 A1 10/2020 Calvin
2020/0334752 A1 10/2020 Doney et al.
2023/0067556 A1 3/2023 Moy et al.
2023/0071800 A1 * 3/2023 Bradley ............ G06Q 20/3672
2023/0081778 A1 3/2023 Yao
(Continued)

FOREIGN PATENT DOCUMENTS

CN 116629861 A 8/2023
JP 2023547308 A 11/2023
WO 2022155534 A1 7/2022

*Primary Examiner* — Paul S Schwarzenberg
(74) *Attorney, Agent, or Firm* — PROCOPIO, CORY, HARGREAVES & SAVITCH LLP

(57) ABSTRACT

A first blockchain system directed to representation of fractional ownership of asset baskets via NFT, each of the asset baskets including a disposal well to generate electricity, and a second blockchain system directed to operations of the asset baskets, the second blockchain system representing the operations of the asset baskets as operation value tokens. For a smart contract executed for an operation for one of the asset baskets, systems and methods include instructing the one of the asset basket to execute the operation according to the smart contracts; intaking sensor data from the asset basket to verify execution of the operation; and for verification of the execution of the operation, generating an operation value token realized as fungible token for one of the asset basket in the second blockchain system; and updating a valuation of the fractional ownership of the one of the asset baskets on the first blockchain system.

20 Claims, 13 Drawing Sheets

(56) References Cited

U.S. PATENT DOCUMENTS

| | | | | |
|---|---|---|---|---|
| 2023/0196341 | A1* | 6/2023 | Quigley | G06Q 30/0631<br>705/65 |
| 2023/0367766 | A1 | 11/2023 | Padmanabhan et al. | |
| 2023/0385965 | A1 | 11/2023 | Jacobson et al. | |
| 2024/0070236 | A1* | 2/2024 | Cella | G06Q 20/065 |
| 2024/0265362 | A1* | 8/2024 | Pedroso | G06Q 40/04 |
| 2025/0272724 | A1* | 8/2025 | Cella | G06N 3/092 |

* cited by examiner

TRUSTED INDUSTRIAL ASSET MONETIZATION USING PRIVILEGED FRACTIONAL NFTs FOR PRIVATE GENERATIVE AI KNOWLEDGE EXTRACTION

BACKGROUND

Field

The present disclosure relates generally to industrial systems, and more specifically to management of industrial assets through use of blockchain and artificial intelligence.

Related Art

In the related art, pumped storage hydroelectricity (PSH), or pumped hydroelectric energy storage (PHES), is a type of hydroelectric energy storage used by electric power systems for load balancing. Existing oil and gas wells with depleted reservoirs (deeper than 1,000-1,500 m) can be used for PSH generation. Such wells typically flow without backpressure or have limited backpressure, while receiving continuous injects of produced water into the depleted zone.

Pumped storage hydroelectricity generation during water disposal in disposal wells has been considered for decarbonization of oil field operations. In such implementations, water is stored at a height to be released into a low-lying area with a turbine that generates electricity. The water provided to the turbine is then subsequently pumped back up to the height. Utility companies may utilize such implementations to pump water when the price of electricity is cheaper and release water when the price of electricity becomes more expensive. Thus, the potential energy of the water is used to generate the electricity.

With respect to the oil and gas industry, when oil is pumped out of a well, a large quantity of water is also produced alongside the oil. At a global level, roughly three to five barrels of water are produced for each barrel of oil. As the oil well continues in operation, more water may be produced from the wells (e.g., ten to 14 barrels of water per barrel of oil) as the oil wells production become depleted. Accordingly, oil and gas industries also have to determine efficient management of such produced water and water disposal.

One way that water is used is to inject the water into lower producing oil wells to effect enhanced oil recovery. Another way that the water is used is to dispose the water into disposal wells, which are managed by disposal well companies and regulated by government agencies. In the latter case, the disposal wells result in additional costs to the oil and gas companies. Depending on the distance from the oil well to the disposal well, the water may need to be transported across long distances, thus incurring costs for both the transport of water as well as for the actual disposal. Separate companies may own the disposal well, which may require pre-treatment and disposal of the post-treatment water and byproducts.

SUMMARY

Accordingly, if the disposal wells can be implemented for producing hydroelectricity, the electricity can be utilized which will be green electricity. Such electricity can be monetized to improve the return on money investment on such disposal wells.

Today, some of the oil wells they are operating in very remote areas where the utility companies cannot easily supply electricity. One of the key benefits of the example implementations is that if such disposal wells are available, the electricity can be generated and used internally or sold to the grid.

Example implementations extend depleted oil and gas wells for facilitating salt water disposal (SWD) to produce the green electricity. Existing oil and gas wells with depleted reservoirs and having total depth greater than 1,000-1,500 meters, can be used as disposal wells which can be repurposed for such PSH generation. Thus, such wells are flowing without or limited backpressure while continuously injecting produced water/SWD into the depleted zone.

In example implementations, there can be a salt water disposal collection and management system, which can facilitate smart transportation of water. The water will be collected from a number of oil wells which are producing to be transported to these disposal wells. The water or the fluid injection regime and management will include a system to facilitate such implementations. The turbine is engaged when the water is released, thereby producing green energy from the potential energy of the water.

Example implementations are directed to an industrial aspect monetization solution, which can include wells PSH Asset Tokenization. The disposal well and its equipment are aggregated as increasing value assets by decarbonized services that can be fractionally owned by the investors as a semi-fungible or non-fungible token.

Example implementations further involve a system for the carbon credit PSH tokenization which will mint the carbon credit token and distribution for the well PSH. During operations of the wells, there will be proof of electricity generation in the form of smart contract settlements on blockchain indicating the amount of electricity produced and sold. The proof will be managed by blockchain so as to have a single-truth track and trace of settlements and carbon credit tokens as operational value tokens for PSH generation.

Example implementations can also facilitate the use of analytics for some of the operational efficiencies to gain more return on investments and more appreciation in value of the effects which are in this particular solution. Examples of analytics can include optimized transportation of SWD based on criteria such as carbon footprint and costs, recommended valuations for that aspect to the investors or the recommended returns, and so on.

Example implementations can further involve a layer architecture, which lets us know what will be included in the solution value. Upon this tokenization and the analytics, the distributed market place can be realized, where all such disposal well owners and oil field owners can participate in a distributed market place where investors can have fractional effect ownerships in such kind of disposal wells or the oil field or the decarbonized oil field operations.

Aspects of the present disclosure can involve a method for a system having a first blockchain system directed to representation of fractional ownership of asset baskets via Non-Fungible Token (NFT), each of the asset baskets including a disposal well configured to generate electricity; and a second blockchain system directed to operations of the asset baskets, the second blockchain system representing the operations of the asset baskets as operation value tokens, the method involving, for a smart contract executed for an operation for one of the asset baskets, instructing the one of the asset basket to execute the operation according to the smart contracts; intaking sensor data from the asset basket to verify execution of the operation; and for verification of the execution of the operation, generating an operation value token realized as fungible token for one of the asset basket in the second blockchain system; and updating a valuation of the fractional ownership of the one of the asset baskets on the first blockchain system. Depending on the desired implementation, the asset basket may also include other oil wells and well equipment.

Aspects of the present disclosure can involve a computer program, storing instructions for a system having a first blockchain system directed to representation of fractional ownership of asset baskets via Non-Fungible Token (NFT), each of the asset baskets including a disposal well configured to generate electricity; and a second blockchain system directed to operations of the asset baskets, the second blockchain system representing the operations of the asset baskets as operation value tokens, the instructions involving, for a smart contract executed for an operation for one of the asset baskets, instructing the one of the asset basket to execute the operation according to the smart contracts; intaking sensor data from the asset basket to verify execution of the operation; and for verification of the execution of the operation, generating an operation value token realized as fungible token for one of the asset basket in the second blockchain system; and updating a valuation of the fractional ownership of the one of the asset baskets on the first blockchain system. The computer program and instructions can be stored on a non-transitory computer readable medium and executed by one or more processors.

Aspects of the present disclosure can involve a system having a first blockchain system directed to representation of fractional ownership of asset baskets via Non-Fungible Token (NFT), each of the asset baskets including a disposal well configured to generate electricity; and a second blockchain system directed to operations of the asset baskets, the second blockchain system representing the operations of the asset baskets as operation value tokens, the system involving, for a smart contract executed for an operation for one of the asset baskets, means for instructing the one of the asset basket to execute the operation according to the smart contracts; means for intaking sensor data from the asset basket to verify execution of the operation; and for verification of the execution of the operation, means for generating an operation value token realized as fungible token for one of the asset basket in the second blockchain system; and means for updating a valuation of the fractional ownership of the one of the asset baskets on the first blockchain system.

DETAILED DESCRIPTION

Figure 1:
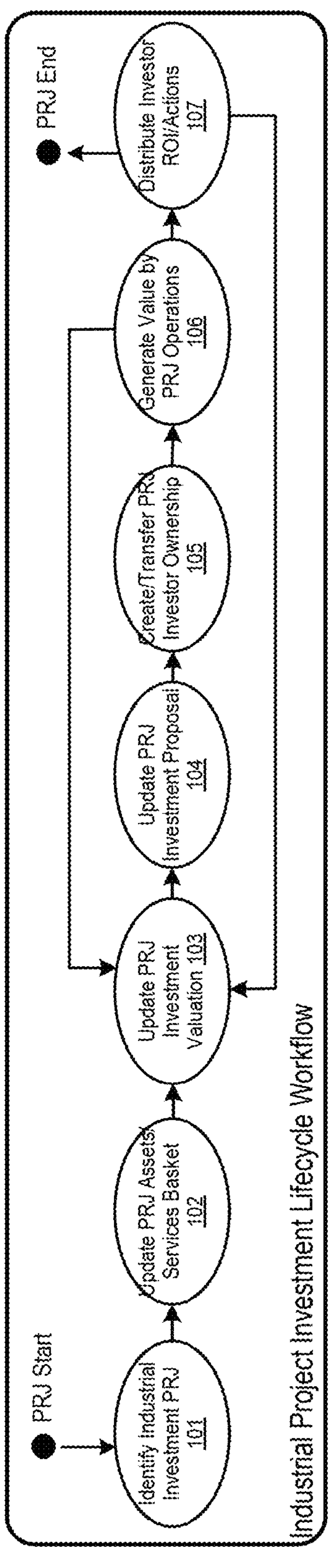
FIG. 1 illustrates an example of the industrial project investment lifecycle workflow, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means or can be implemented through a desired algorithm. Example implementations as described herein can be utilized either singularly or in combination and the functionality of the example implementations can be implemented through any means according to the desired implementations.

FIG. 1 illustrates an example of the industrial project investment lifecycle workflow, in accordance with an example implementation. Opportunities for industrial investments can be very challenging for a layman investor. There is significant friction for investors in industrial projects, such as low liquidity and lock-in periods, as well as complex enterprise contracts. There is low visibility into returns and valuations, thereby requiring significant paperwork.

To address the above issue, example implementations described herein facilitate dynamic/changing of fractional ownership of industrial investments and also facilitate an immutable identity for multiple assets and services in an investment basket. For an investment basket which has multiple assets, such assets may breakdown or need to be replaced. Example implementations described herein also facilitate the generation of enterprise contracts based on actual operations and changing business landscape of industrial project during transfer of fractional ownerships. When fractional ownership changes, the value as well as the term of the contract may change. Example implementations use artificial intelligence (AI) based solutions to understand all these implications and use smart contracts to generate this enterprise contract. Example implementations further facilitate investment analysis or insights for the opportunity based on managed access by current owners to trusted internal data of investment basket that can be used with other systems such as AI based systems.

In the lifecycle workflow illustrated in FIG. 1, in the context of disposal wells, when the capital investment starts, the industrial investment project is identified 101. At 102, the project assets are updated, and services may also be added to the investment basket. The project investment valuation is updated at 103. At 104, there is a proposal which will have the terms of investment contract and valuation for investors. At 105, there is the creation and transfer of investor ownership. When the project becomes operational, there is a generation of value at 106. In this case, the value could be green electricity generated or the value could be operational efficiencies which are attained due to having analytics to optimize the operations. Lastly at 107, there is the distribution of investor return of investment or some actions which will need like some approval. Then, the project ends.

Figure 2:
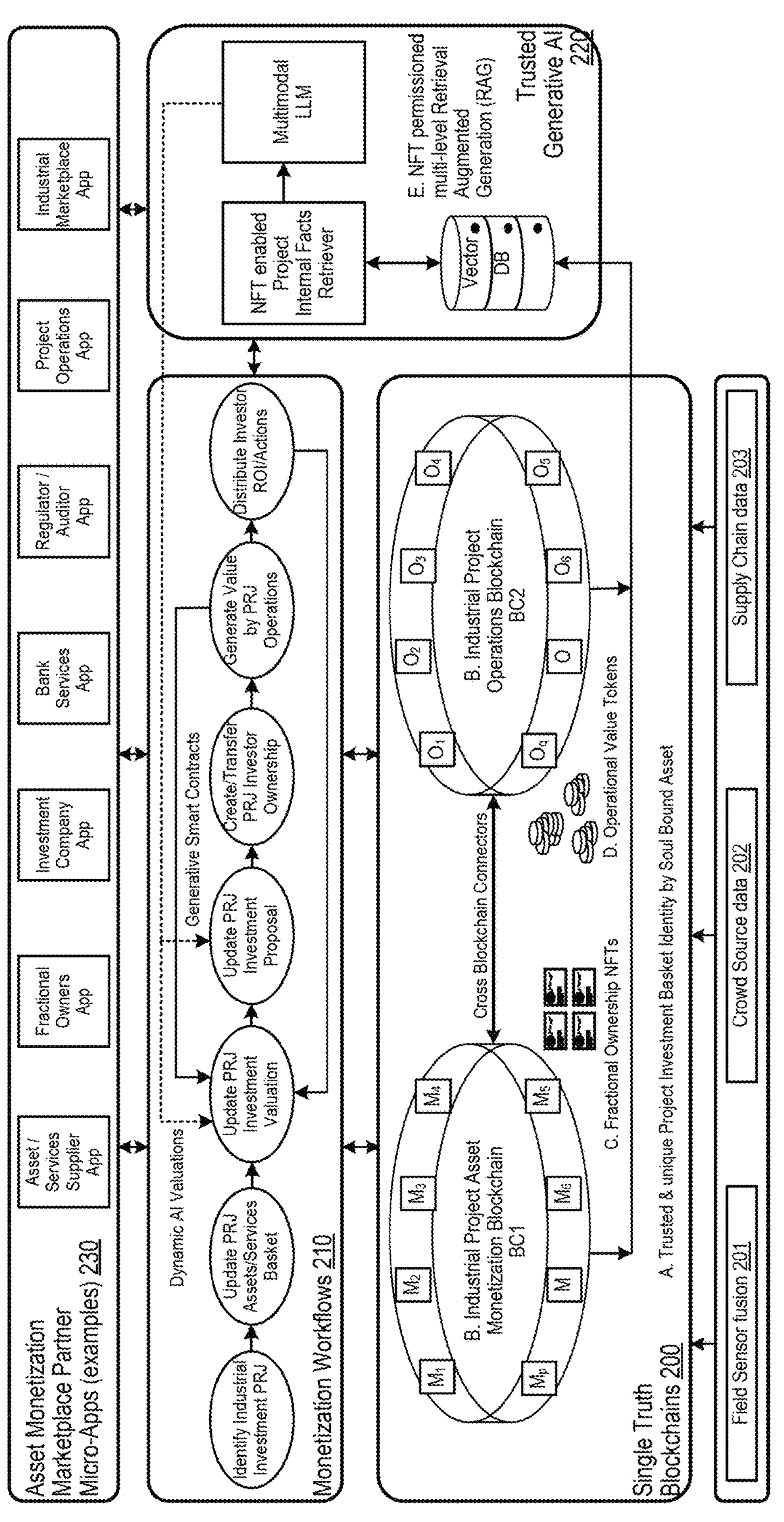
FIG. 2 illustrates the overall system and workflows to which the example implementations can be applied.

FIG. 2 illustrates the overall system and workflows to which the example implementations can be applied. The example system of FIG. 2 facilitates a generative AI system for trusted industrial project monetization.

In a first aspect, there is a trusted and unique project investment basket identity formed from single truth blockchains 200 and monetization workflows 210. In the investment basket there are assets and services. At first, the asset that will not change are considered, such as wells and their location because the location does not change. This asset is referred to herein as a soul bound asset, in a similar manner to soul bound tokens used in blockchain standards. The soul bound asset is a single asset in the project investment asset basket. The project basket is created around the unchangeable asset, upon which mechanisms are utilized to detect any changes to the asset. Such mechanisms can generate data such as field sensing data from field sensor fusion 201 such as global positioning satellite (GPS), crowd source data 202 (e.g., people taking pictures or measurements of the asset), and supply chain data 203 for the company implementing the project. The supply chain data 203 may be pulled from an enterprise resource planning server or internal data from the supply chain.

In a second aspect there are two blockchains to form the single truth blockchains 200. One blockchain is the industrial project asset monetization blockchain (BC1), which contains data regarding the soul bound assets and the investment information, as well as the fractional owner Non-Fungible Tokens (NFTs). When the project becomes operational, they offer fractional investments and there is a period when all the assets need to be assembled and placed into operations. When the operation starts, there is a second blockchain which is called the industrial project operations blockchain (BC2). This blockchain supports high speed transactions involving value tokens. So as an underlying asset, such as a well, becomes operational, the tokens can be given for electricity generation or improvement in services as incentivization tokens.

In another aspect, there is a trusted generative AI system 220 that can involve a vector database, and is managed as a private generative AI system. This system can be configured to facilitate an NFT-enabled project internal facts retriever, wherein the actual multimodal large language model can be implemented in accordance with the desired implementation.

Additionally, there is a monetization workflow 210 upon which micro applications 230 can be implemented. Each investment project and the system stakeholders can be associated with a targeted micro application, such as a supplier application, fractional owners application, investment company application, and so on.

Figure 3:
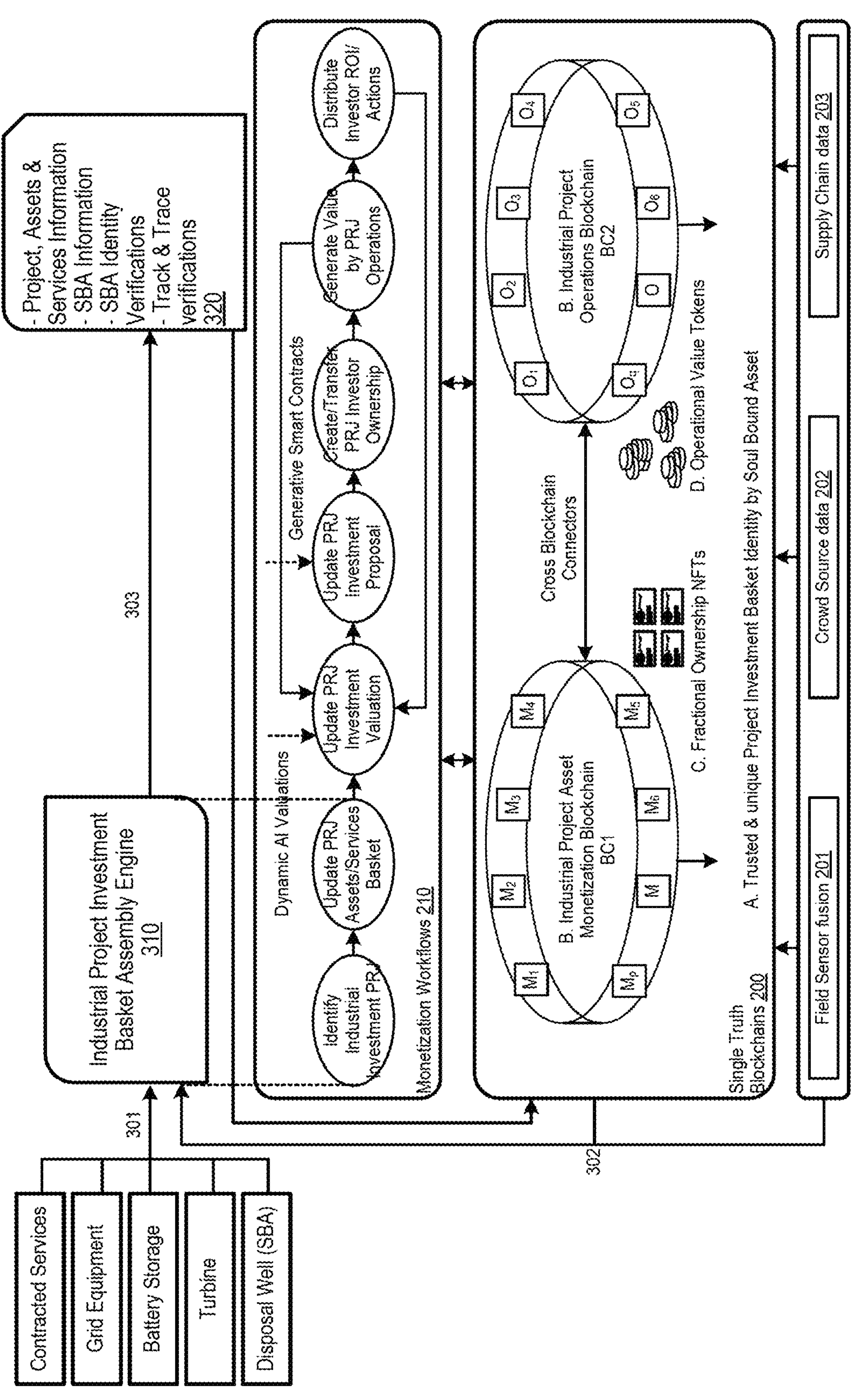
FIG. 3 illustrates an example flow for creating a unique and trusted project basket for monetization, in accordance with an example implementation.

FIG. 3 illustrates an example flow for creating a unique and trusted project basket for monetization, in accordance with an example implementation. Industrial projects require a trusted set of physical equipment/assets and service providers organized in a project basket that are operating to provide value for monetization. At least one asset in the project basket exists having immutable changes throughout the life-cycle of the project to provide a unique identity to the project. Such asset is referred to herein as the Soul Bound Asset (SBA) for the project basket. SBA is the trusted unique identity of the project. SBA is the core asset around which other assets and services are added in the project basket hierarchy to provide value for monetization to industrial projects. SBA can be remotely and physically verified by investors/stakeholders with its lifecycle history on decentralized asset monetization blockchain.

At first at 301, the physical assets and the contracted services are added into the investment basket and an SBA is selected. Examples of asset/equipment can include grid equipment, battery storage, turbine, the disposal well, and so on. In this example, the disposal well is selected as the SBA, and all of such information is provided to the industrial project investment basket assembly engine 310. At 302, sensor fusion is configured for live asset tracking and crowd sourced data for project identity, as well as supply chain data from supply chain partners. The engine 310 will also reference BC1 blockchain for data regarding the assets and services contracted. Such data is collected in conjunction with the SBA. Once the industrial project basket is ready, then at 303, an updated trusted project investment basket for the investors is created. The unique project identity is validated by the SBA, and track and trace pathways are constructed. The track and trace pathways are information to track and trace all the changes which are happening to the assets or to the services in the project investment basket.

Output from the industrial project investment basket assembly involves a list of the project details, which can include the list of assets and services and information associated with the project, SBA information. This allows any entity/stakeholder to uniquely identify the SBA, carry out any verification once investment in the project is made, and verification that the SBA exists or not, along with track and trace verifications.

Output 320 from the engine 310 can include project, assets, and services information, SBA information, SBA identity verifications, and track and trace verifications. Industrial projects require a trusted set of physical equipment/assets and service providers which are organized in a project basket operating to provide value for monetization. At least one asset in the project basket exists, the SBA, having immutable changes throughout the lifecycle of the project to provide unique identity to the project. SBA is trusted unique identity of the project. The SBA functions as the core asset around which other assets and services are added in the project basket hierarchy to provide value for monetization to the industries. SBA can also be remotely and physically verified by investors/stakeholders with the lifecycle history on the blockchains for the monetization part.

Figure 4:
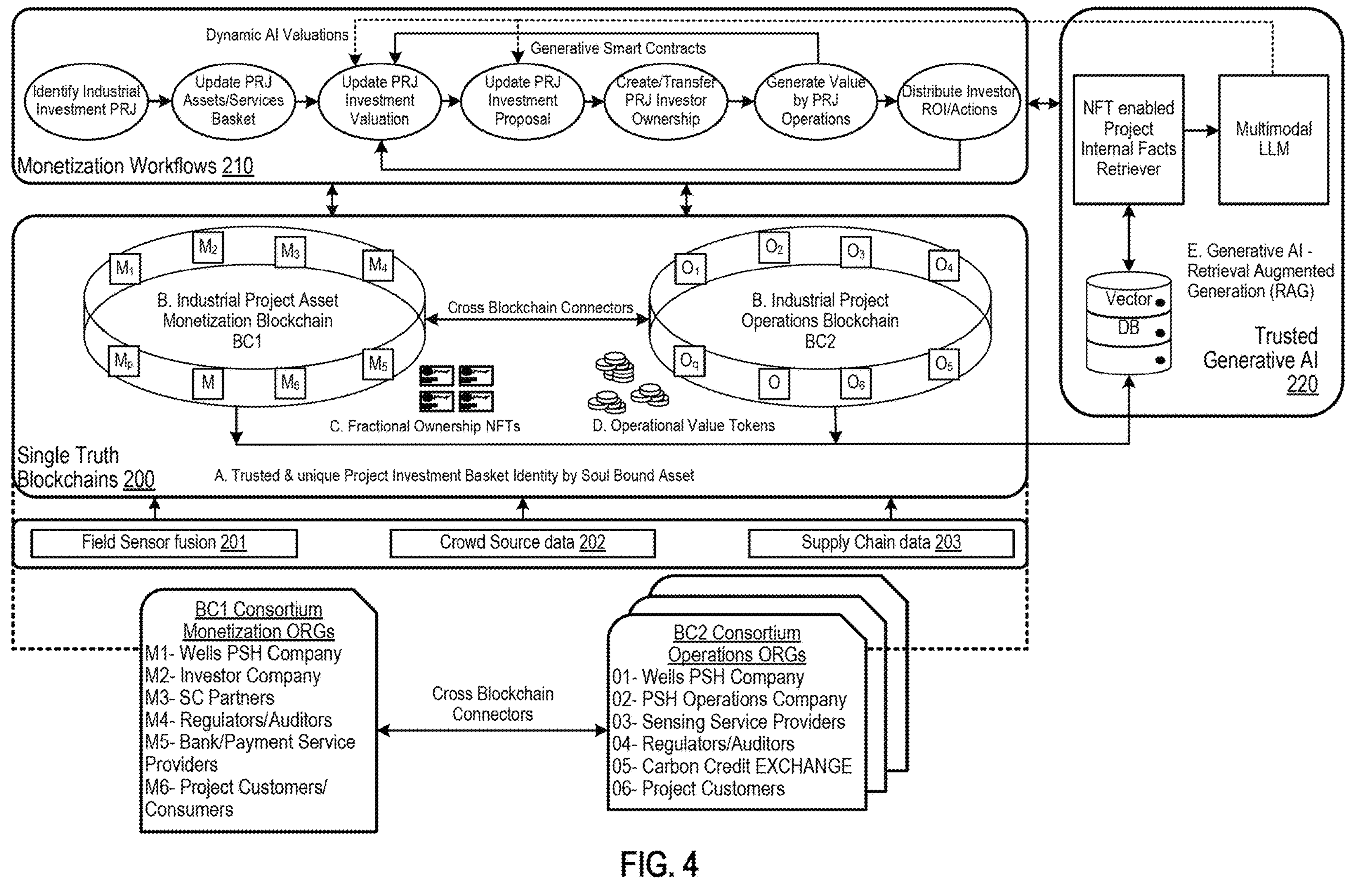
FIG. 4 illustrates an example for establishing industrial asset monetization and the operations blockchain, in accordance with an example implementation.

FIG. 4 illustrates an example for establishing industrial asset monetization and the operations blockchain, in accordance with an example implementation. At first, a blockchain consortium of partners/stakeholders for the Industrial Asset Monetization (BC1) is established for trusted immutable tracking and traceability of project investment basket components such as SBA, Assets, Service Providers, Owners, Investor Actions, and so on. BC1 is scoped for fractional ownership in industrial projects. The frequency of blockchain transactions on BC1 is assumed to be low in comparison to project operations transactions.

Then, a blockchain consortium of partners/stakeholders for the Industrial Asset Operations (BC2) is established for trusted immutable tracking and traceability of project operations components having high frequency of transactions, such as asset performance, proof of work by assets, revenue value, and so on. BC1 and BC2 communicate among themselves to provide single truth for assets and operations in industrial projects.

In the example of FIG. 4, for BC1 there is a list of partners and probable partners, and Wells PSH Company is designated as being in charge of that project. There are also various investment companies, supply chain partners, regulators and auditors, bank and payment service providers, the project customers, and consumers for this consortium. The project customers and consumers for PSH will be the grid electricity company or any company which is purchasing power from the company for that project.

When the project is set up and operational, then these are the partners for the second blockchain BC2. In the example of FIG. 4, there is the Wells PSH Company, which is the company operating—those particular assets and responsible for their operations. In addition, there are sensing service providers, regulators and auditors, carbon credit exchange companies which will be on this for giving the carbon credits, and the project customers which actually buy electricity.

Hence, at first, a blockchain consortium is established with its partners or stakeholders for the industrial asset monetization for trusted immutable tracking traceability of the project investment basket components, which are the soul bound asset, all the other assets, the service providers, the owners, investor action, and so on. BC1 is also used to facilitate fractional ownership in industrial projects. The frequency of blockchain transactions is assumed to be low in comparison to project operations. The reason is because any change in the assets will not be so frequent. Further, even the investment frequency should be low, although the purchase/sale of investment as fractional ownership can be high.

In contrast, the second blockchain BC2 is for the industrial asset operations, to track and trace the project operations components. This has a high frequency of transactions for asset performance, proof of work by assets, revenue value, and so on. The two blockchains can communicate among themselves to provide single truth for assets as well as operations in the industrial project via cross blockchain connectors as illustrated in FIG. 4.

Figure 5:
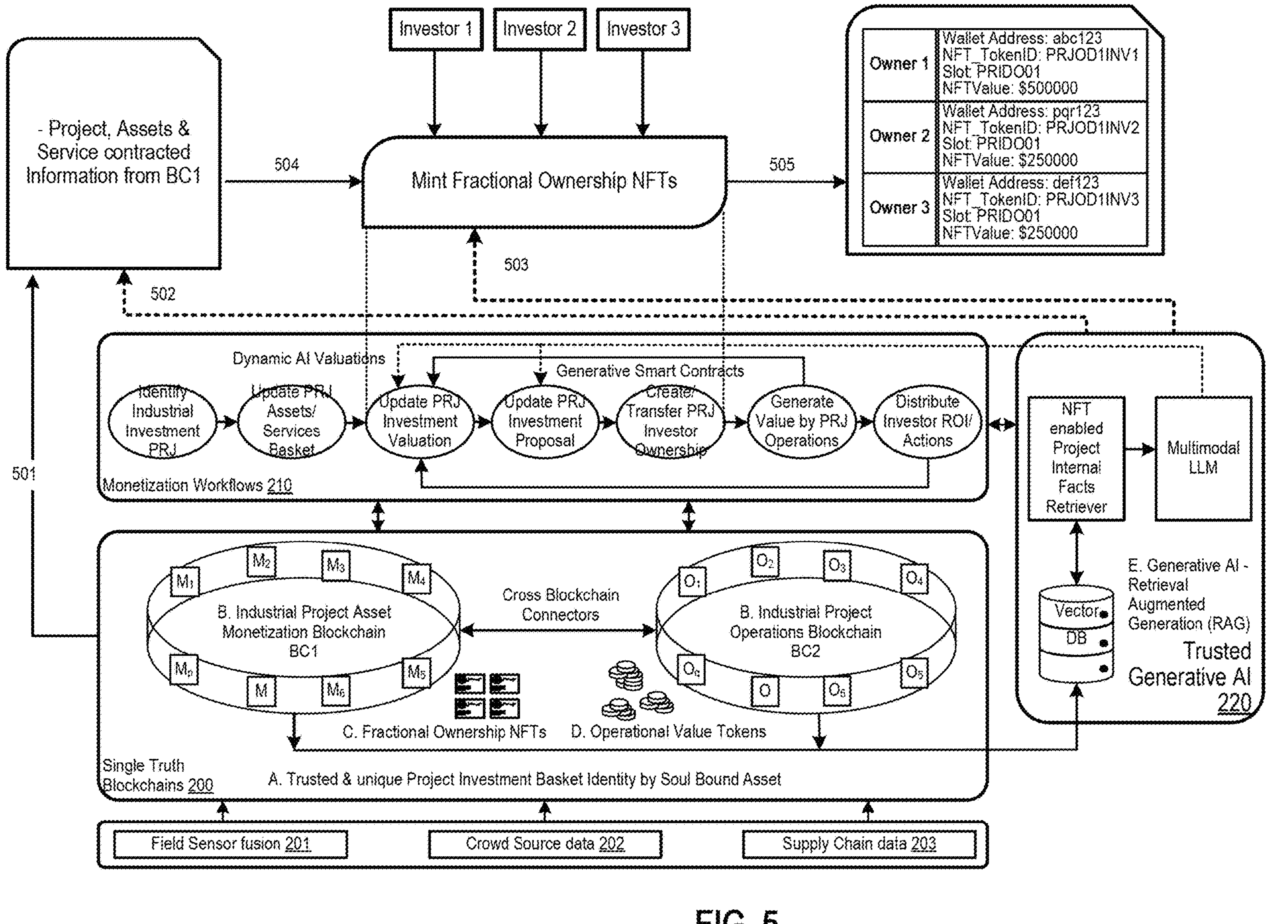
FIG. 5 illustrates an example flow for the project fractional ownership NFTs for initial investors, in accordance with an example implementation.

FIG. 5 illustrates an example flow for the project fractional ownership NFTs for initial investors, in accordance with an example implementation. At first, the system establishes a blockchain consortium of partners/stakeholders for the Industrial Asset Monetization (BC1) for the trusted immutable tracking and traceability of project investment basket components as illustrated in FIG. 4. At 501, the flow obtains project assets and services contracted information from BC1 and operations information from BC2.

At 502, assuming that the project is now operational, the flow obtains the latest Project Valuation estimates from AI/Analytics as provided by the trusted generative AI 220. Validation from regulatory agencies (e.g., investment, project, environment, etc.) can also be received. When operations are added, there can be a corresponding increase in the valuation of the project basket, for which the net effect can be determined from AI or analytics. In this example, retrieval augmented generation (RAG) is utilized, but other analytics or AI can be utilized to facilitate the desired implementation.

At 503, the flow obtains the project investment and operation contracts from Generative AI, and obtains validations from regulatory agencies for making an investment proposal to investors, along with the valuation as generated by trusted generative AI 220.

At 504, the flow obtains verified investors with their initial capital and agreements on the investment proposal. As illustrated herein, the investment proposal can be in the form of smart contracts generated by trusted generative AI 220. Negotiations can also be facilitated for each of the initial fractional ownership proposals. On the platform, verified investors can be onboarded from which in response to currency deposits as investment from them an NFT will be returned.

At 505, the fractional ownership NFTs are minted to the initial investors/owners. The NFTs can have buy/sale operations on the BC1 marketplace. As illustrated in FIG. 5, the actual fractional ownership entities, owners 1, 2 and 3, can include a valid address, unique NFT token ID, and identical slots (e.g., the project identifier or parameters/attributes of the SBA). The NFT value is the actual value which functions like a share value for the fractional owners.

Figure 6:
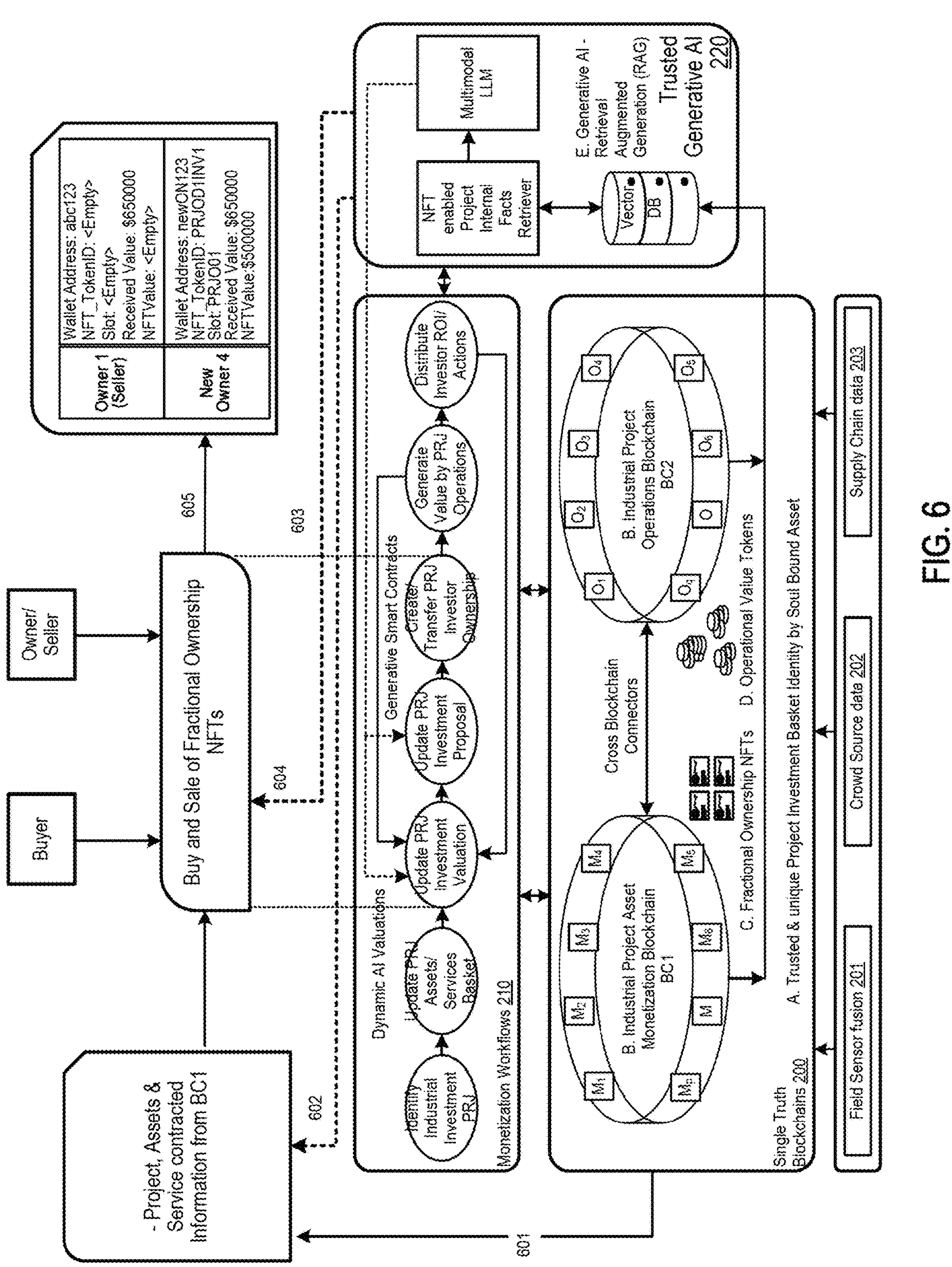
FIG. 6 illustrates an example flow of buy and sale operations of project fractional ownership NFTs, in accordance with an example implementation.

FIG. 6 illustrates an example flow of buy and sale operations of project fractional ownership NFTs, in accordance with an example implementation. At first, assume that a buyer and an owner agree to a fractional ownership sale and transfer of investment on the Industrial Asset Monetization Market Place. Buyer Validates the fractional ownership of Seller's NFT on BC1. At 601, the flow obtains project assets and services contracted information, which includes owner NFT details, as well as project basket and operations Information from BC1 and BC2.

At 602, the flow obtains the latest Project Valuation estimates from AI/Analytics as well as the validation from Regulatory agencies (Investment, Project, Environment, and so on). At 603, the flow generates the project investment and operation contracts from Generative AI, and obtains validations from regulatory agencies for making an investment proposal. At 604, the flow obtains the buyer with their initial capital and agreements on the investment proposal. At 605, the flow transfers fractional ownership NFT from seller to buyer.

As illustrated in FIG. 6, buyer and owner agree to a fractional ownership sale and transfer. Buyer validates fractional ownership of seller's NFT from the details provided. Then, the project assets and service as well as the project valuation from analytics to generate the operation contracts, and validation from the regulatory agency for the investment proposal is also obtained. When the workflow is complete, the buyer with the initial capital and agreements deposit the funds, and the seller then transfers the NFT for the fractional ownership.

Figure 7:
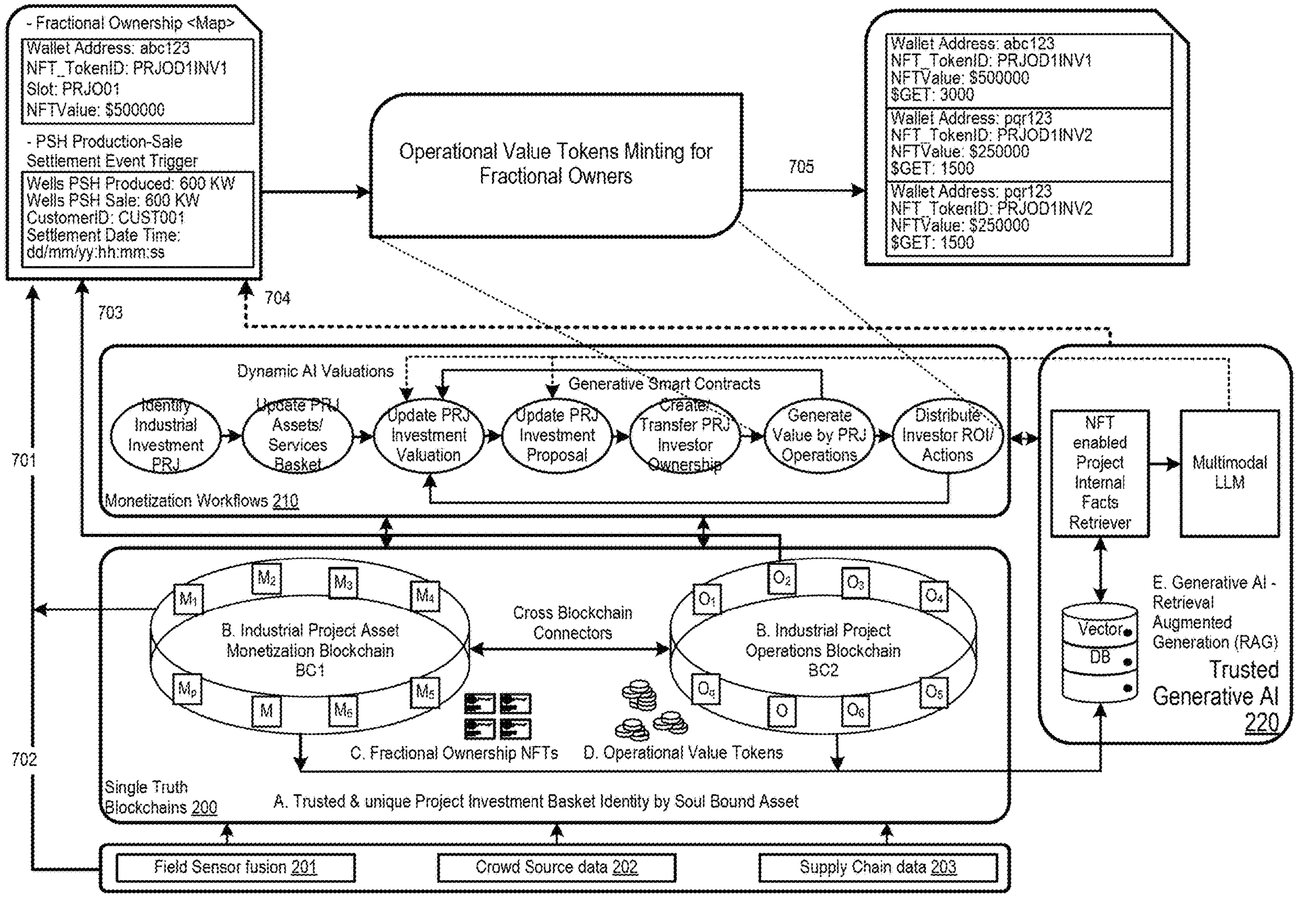
FIG. 7 illustrates an example of a project fungible operational value minted for distribution to fractional asset owners, in accordance with an example implementation.

FIG. 7 illustrates an example of a project fungible operational value minted for distribution to fractional asset owners, in accordance with an example implementation. In the example of FIG. 7, the fungible operation value token is minted to increase the returns for the fractional owners. Fractional owners can thereby receive the return based on the profit and loss of the project, as well as additional operational value based on incentivization as provided to the fungible operational value. For the operational value token minting, whenever settlement takes place for sale and generation, the same party should be able to mint tokens.

At 701, the flow obtains the fractional owner NFT from the first blockchain BC1. At 702, the flow obtains the project production and sales information from the sensor fusion, and/or as derived from the supply chain data and from the blockchain data.

At 703, the flow configures the sensor fusion system from industrial SCADA/IoT systems for obtaining the single truth of operations on second blockchain BC2. The flow may also add other operational data inputs to build triggers for production and sales settlements as proofs for project revenue based on single truth accounting on blockchain BC2. Accordingly, there is a trigger defined for the proof of value settlement. Such a trigger can include, but is not limited to, whenever settlement of generation, green electricity generation, or a sale takes place, when electricity is provided to the grid, and so on, in accordance with the desired implementation.

At 704, the flow obtains the optimal smart contract parameters for the operational value token to be minted on the second blockchain BC2. Such parameters can be based on the parameters of the trigger at 703.

At 705, upon successful settlements, fungible value tokens are minted for the current project's NFT Owners. These Value Tokens can be exchanged or sold by the NFT owners thereby providing more ROI for fractional owners. In example implementations, the $GET is Green Energy Token as an example of operational value token that can be used for carbon credits by fractional owners.

Figure 8A:
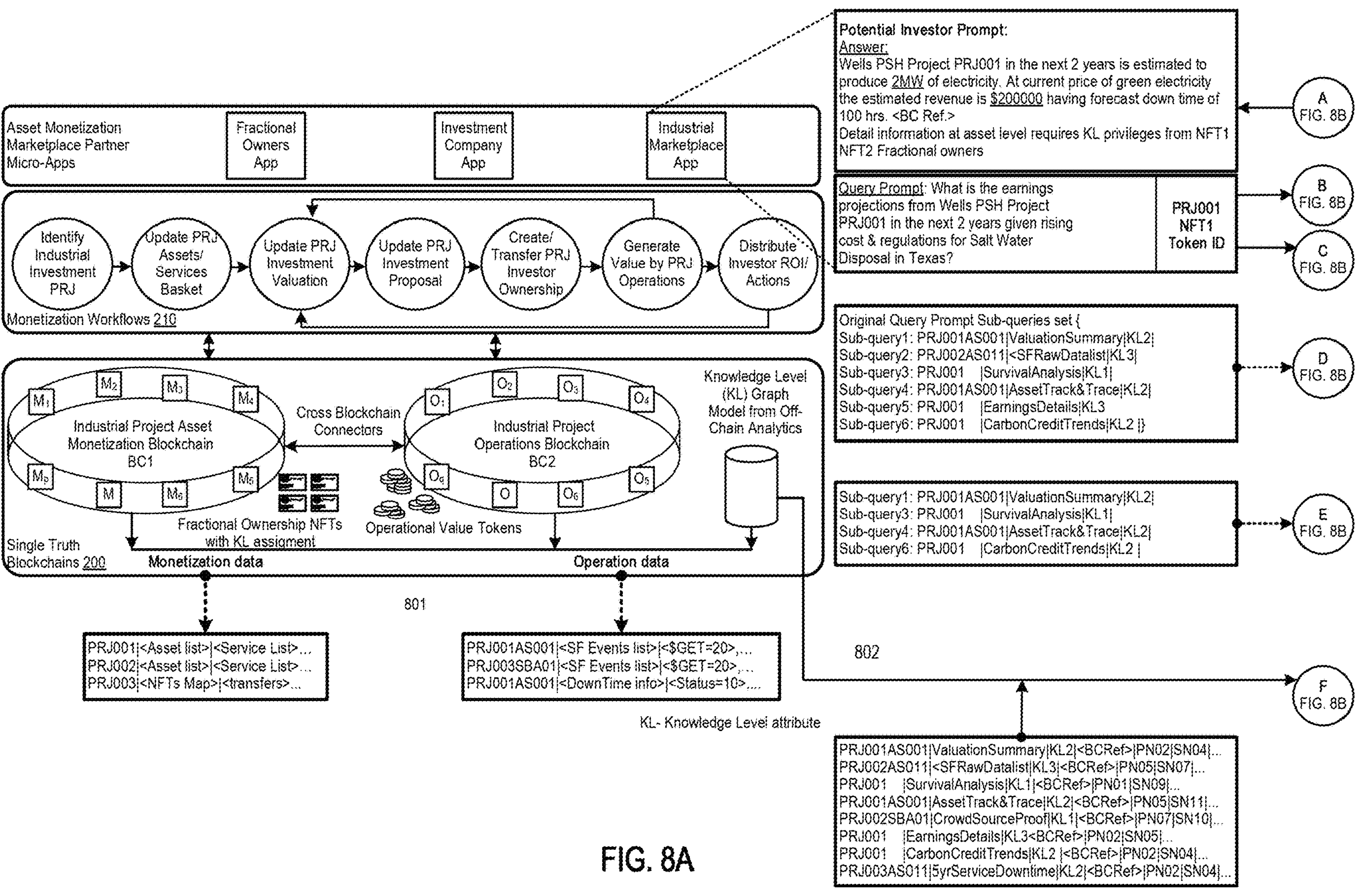
FIGS. 8A and 8B illustrate an example system involving a generative AI for potential customer investment analysis, in accordance with an example implementation.
Figure 8B:
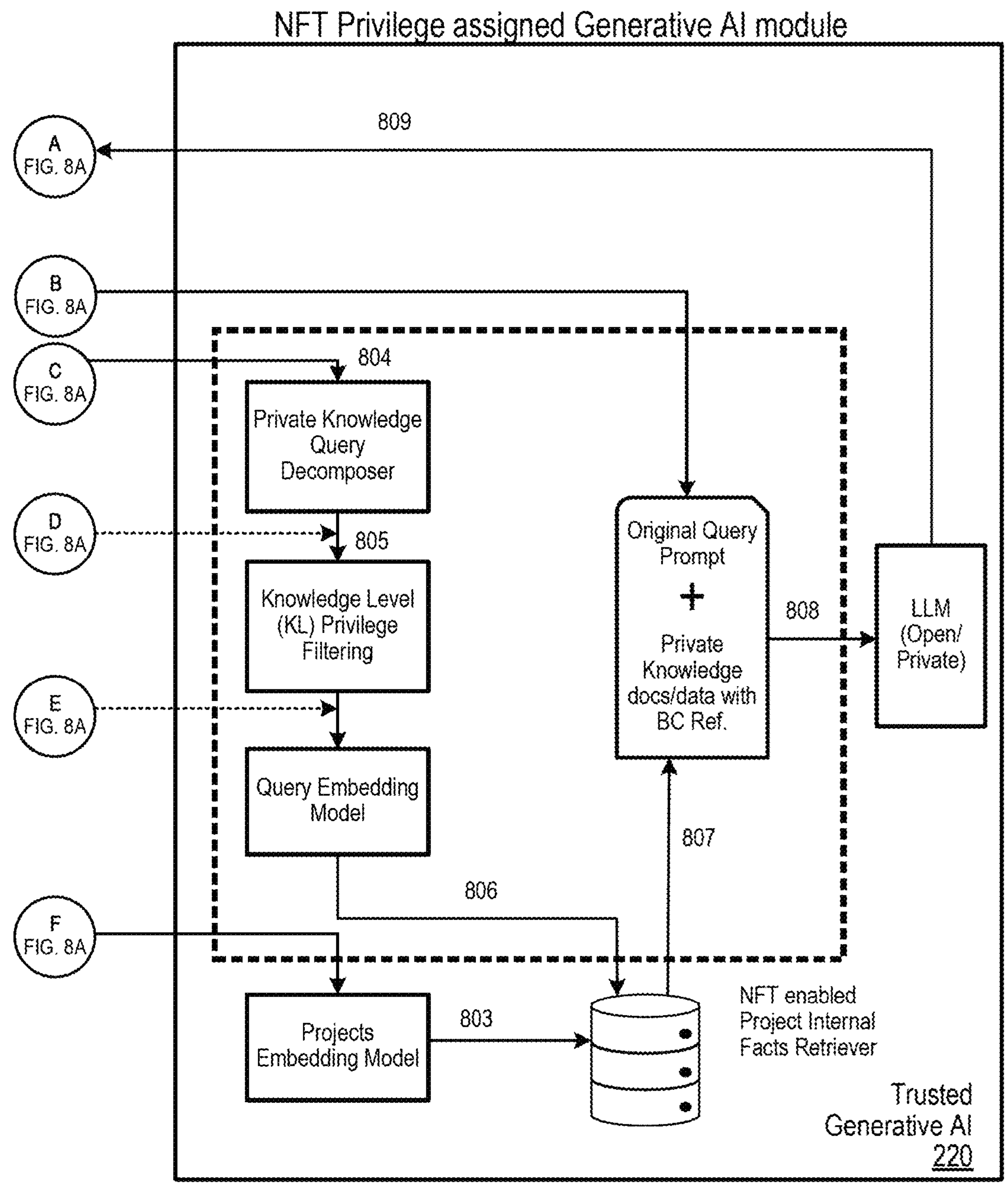

FIGS. 8A and 8B illustrate an example system involving a generative AI for potential customer investment analysis, in accordance with an example implementation. The example implementations of FIGS. 8A and 8B are directed to utilizing generative AI for potential investor's investment analysis. The target audience for this use case is potential investors in the industrial asset monetization marketplace. Such investors look at all the projects, and would like to obtain additional insights by using generative AI to determine the setup of the investment, as well as how these projects currently operate. In the example of FIG. 8A and FIG. 8B, potential investors may have a query prompt, for example, "What is the earning predictions from this PSH project, PRJ001 in the next two years, and given rising costs and regulations for salt water disposal in Texas?" or another similar high-level query. The query prompt will be linked to the corresponding NFT the potential investor is interested to buy, and placed through a pipeline to be processed through private generative AI. As shown in FIGS. 8A and 8B, there is a private knowledge query decomposer which will decompose the query by using LLM or knowledge graph level model for project level information. Additionally, based on the associated project (e.g., from the NFT token ID or NFT metadata) the flow will conduct knowledge level privilege filtering. So once the query is decomposed into subparts, each subpart will have a knowledge level. The filtering is facilitated depending upon what knowledge level privilege is attached to this NFT.

At 801, the flow obtains the project monetization and operation facts multimodal data from first blockchain BC1 and second blockchain BC2. At 802, the flow obtains off-chain data with Knowledge Levels (KL). Fractional Owner NFTs are assigned KL privileges at group and individual level. The flows of 801 and 802 is a precursor to starting the knowledge level, such as decomposition in here. Thus, knowledge level graph models from off-chain analytics can be provided. Examples of operational facts to be provided can include, but is not limited to, project ID, asset list, service list, and the token ID, the events list, and issued green energy tokens.

At 803, the flow generates vector embeddings with KL in NFT metadata.

At 804, the flow decomposes the query by using LLM/Knowledge Level Graph Model for project level information. At 805, the flow applies KL filters for NFT1 owner privileges extracted from NFT Token URI. In this example, there is a query embedding model. In this step, KL filters are applied for NFT1 owner privileges, which are extracted from the NFT token URI.

At 806, the flow sends sub-queries embeddings for retrieval. From the query embedding model, sub-query embeddings are provided to the vector DB. At 807, the flow retrieves private knowledge multimodal project information. From this vector DB, the flow can retrieve private knowledge multimodal project information, depending upon the knowledge level privilege. The private knowledge, in addition to this it will send references of actual documents, all data, also the blockchain, you know, transaction reference, it will send this. At 808, the flow sends the query with the private knowledge data to the LLM. The flow will combine the private knowledge data retrieved with the original query prompt and then send it to the LLM. The LLM can be open source, or it could be privately hosted depending on the desired implementation.

At 809, the response to the users from the LLM will be sent with the blockchain references. The answer to the query will come from the LLM in the form of detailed information. An example output to the original query is "Wells PSH will produce X amount of electricity over the next two years. At the expected prices of electricity, the revenues will be Y". Further, blockchain references will also be provided to which they can click and they can query the blockchain.

Additionally, feedback requesting elevated KL privileges from NFT owners can also be provided at 809. In the query decomposer, some elements of the query will be restricted based on access privilege. For example, certain detailed information at asset level may require knowledge level privileges from NFT1, 2 or 3, depending on the current contract. The potential investor would therefore require an elevation in the privilege to obtain further levels of knowledge extraction from all NFT owners of the project.

Figure 9A:
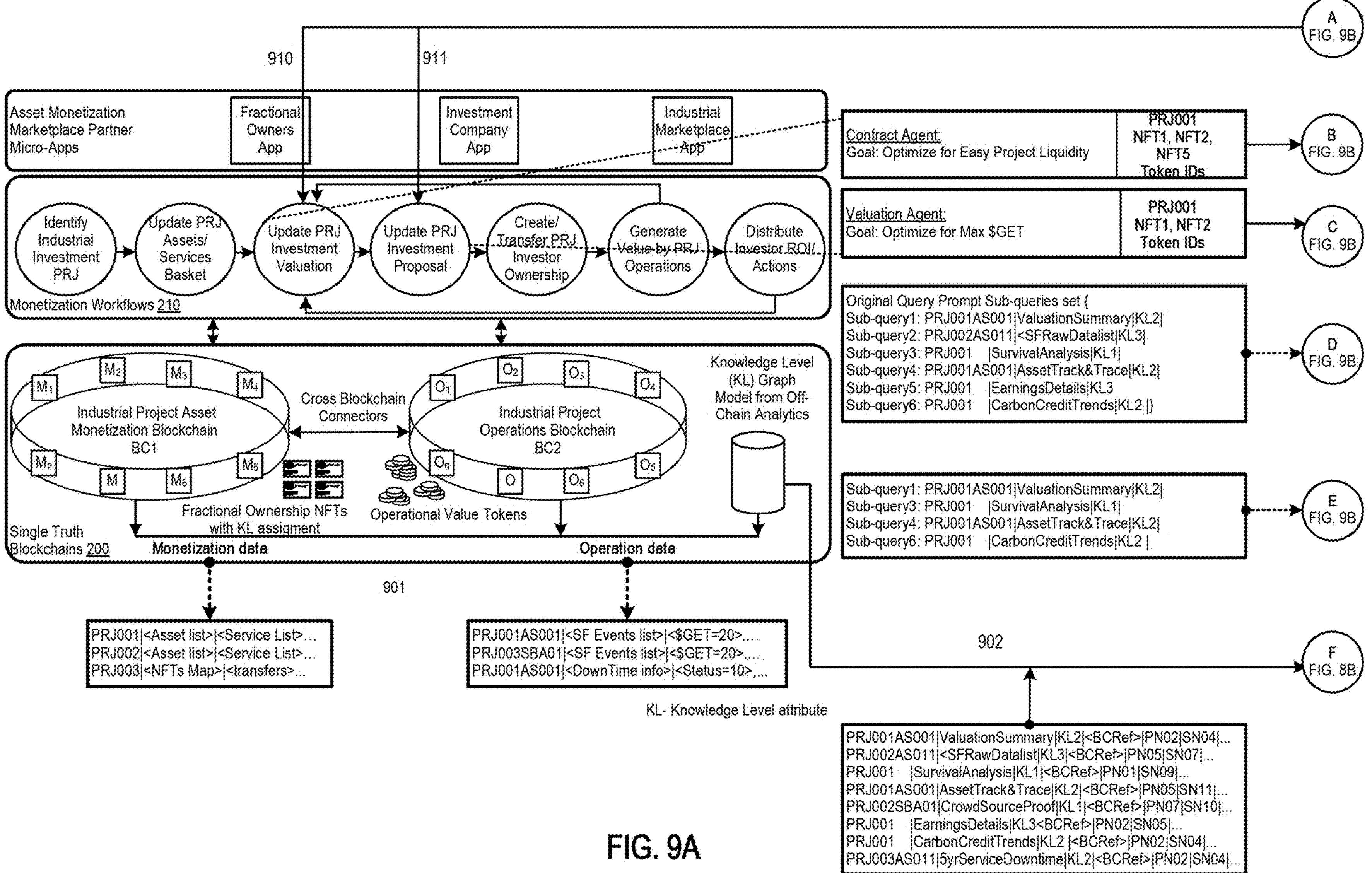
FIGS. 9A and 9B illustrate an example flow for generative AI for automated project valuation and contract generation, in accordance with an example implementation.
Figure 9B:
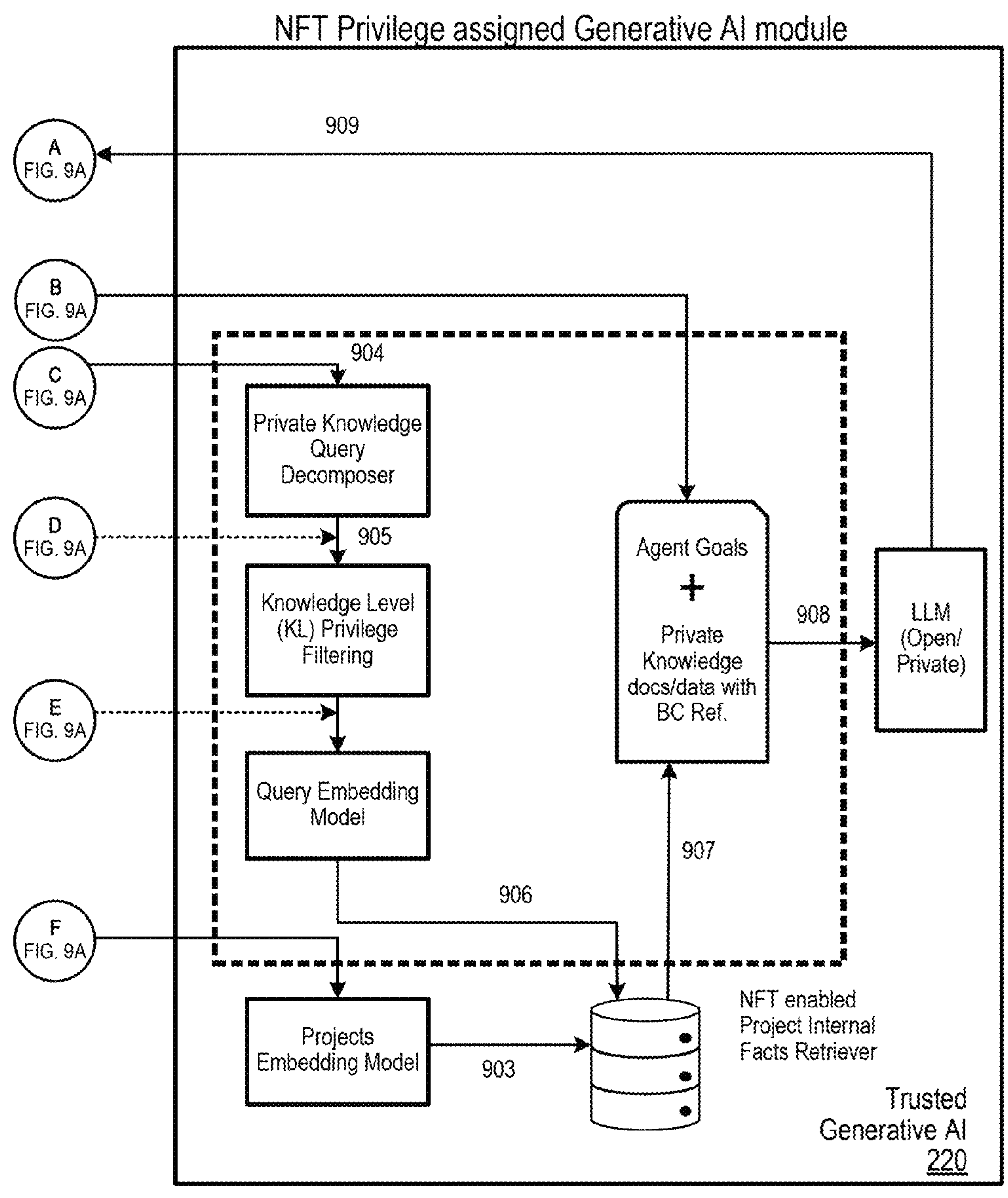

FIGS. 9A and 9B illustrate an example flow for generative AI for automated project valuation and contract generation, in accordance with an example implementation. Instead of a prompt, there are agents that behave to provide actions as prompts and can be specialized, such as a contract agent or a valuation agent. Such agents can have a specific goal. For example, the contract agent might have a goal for the investor to provide easy exit from investment. The agents are used by the investor to optimize for project liquidity.

At 901, the flow obtains project monetization and operations facts multimodal data from first blockchain BC1 and second blockchain BC2. At 902, the flow obtains off-chain data with Knowledge Levels (KL). Fractional Owner NFTs are assigned KL privileges at the group and the individual level. At 903, the flow generates vector embeddings with KL in NFT metadata. At 904, the flow decomposes the query by using LLM/Knowledge Level Graph Model for project level information.

At 905, the flow applies KL filters for NFT1 owner privileges extracted from NFT Token URI. At 906, the flow sends sub-query embeddings for retrieval. At 907, the flow retrieves private knowledge multimodal project information. At 908, the flow sends the agent goals along with the private knowledge to the LLM. At 909, the flow sends a response from LLM with blockchain references and feedback to ask for elevated KL privileges from NFT Owners as needed. At

910 the flow provides the updated investment valuation. At 911, the flow generates the updated investment proposal contracts.

As shown in FIGS. 9A and 9B, the output can involve updated investment valuations which is the output from the valuation agent and generated updated investment proposals, which is the output from the contract agent.

Industrial Projects have large capital requirements for long term that require investment decision from multiple partners data and contracts in complex business environments. Blockchain and Generative AI enabled monetization enable such decisions using trusted fractional ownership as NFTs, and provide easy onboarding/offboarding for investors/financers in industrial monetization marketplace.

Blockchain enabled end-to-end track and trace of industrial assets in projects provide trust to have verifiable identity and enable privileged based knowledge extraction from LLMs that map to current fractional owner NFTs for potential investors and other stakeholders.

Example implementations also automate generation of enterprise contracts from single truth blockchain consortium data and Generative AI knowledge extraction of changing business landscape during fractional ownership transfers among partners.

Further, the example implementations qualify potential investor or other users for access to private knowledge of project by fractional owners using privileges settings in fractional NFTs, thereby limiting access to project data for public but providing such information only to potential investors in knowledge insights from Generative AI. The solution can provide progressive knowledge insights by consensus among current fractional NFT owners based on interest level for potential investments/transfers in industrial marketplace.

Figure 10:
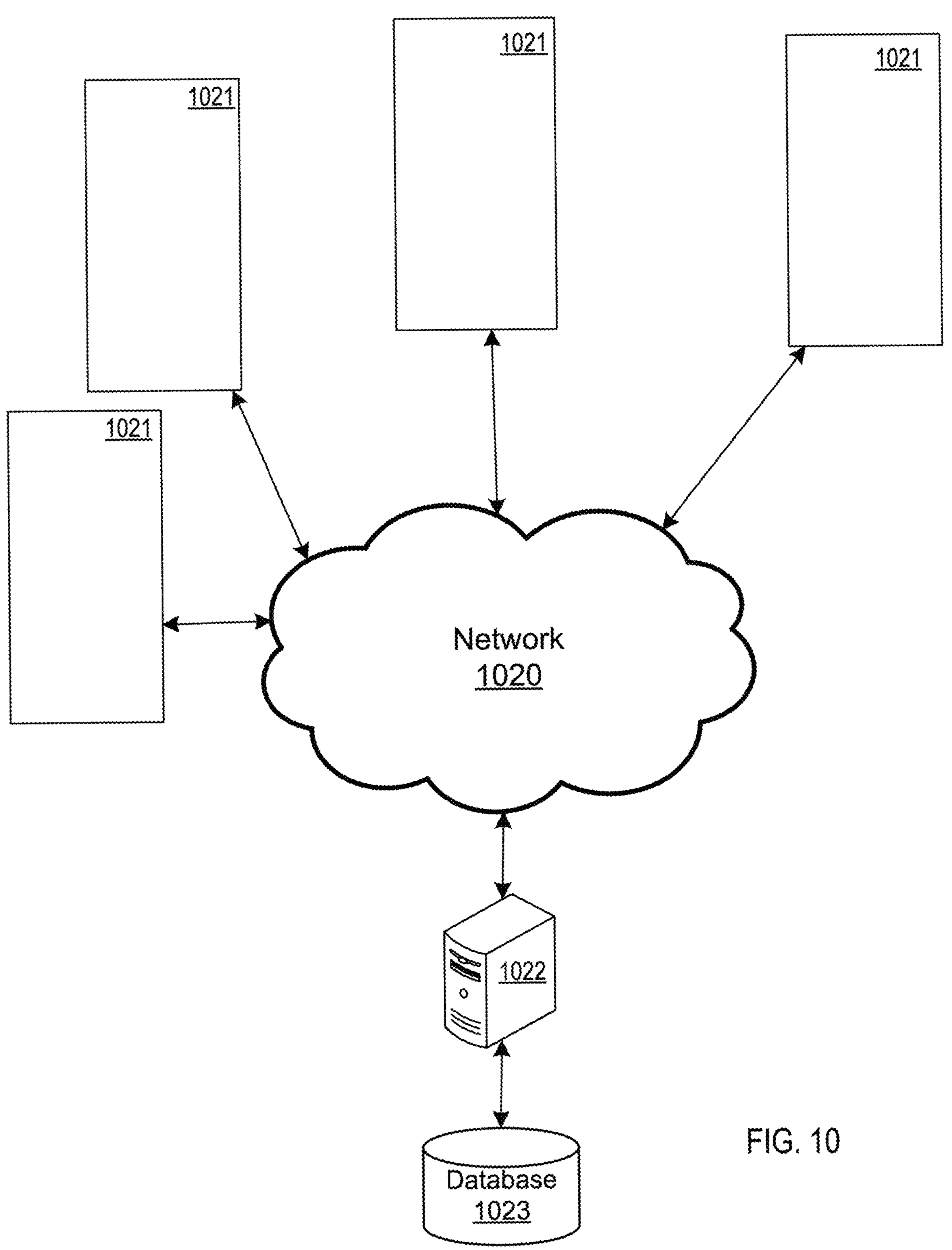
FIG. 10 illustrates a plurality of disposal wells that are networked to a management apparatus, in accordance with an example implementation.

FIG. 10 illustrates a plurality of disposal wells that are networked to a management apparatus, in accordance with an example implementation. One or more disposal wells 1021 involve physical machines and equipment (e.g., sensor systems, well structures, electricity generators, etc.) that are communicatively coupled to a network 1020 (e.g., local area network (LAN), wide area network (WAN)) through the corresponding network interface of the sensor system installed in the disposal well 1021, which is connected to a management apparatus 1022 configured to facilitate the functionality for conducting operations and measurements. The management apparatus 1022 manages a database 1023, which contains historical data collected from the sensor systems or data collecting mechanisms from each of the disposal wells 1021. In alternate example implementations, the data from the sensor systems of the disposal wells 1021 can be stored in a central repository or central database such as proprietary databases that intake data from the disposal 1021, or systems such as enterprise resource planning systems, and the management apparatus 1022 can access or retrieve the data from the central repository or central database. The sensor systems of the disposal wells 1021 can include any type of sensors to facilitate the desired implementation and provide internal status machine data, such as but not limited to voltmeters, global positioning satellite (GPS), thermometers, humidity gauges, or any sensors in accordance with the desired implementation.

Figure 11:
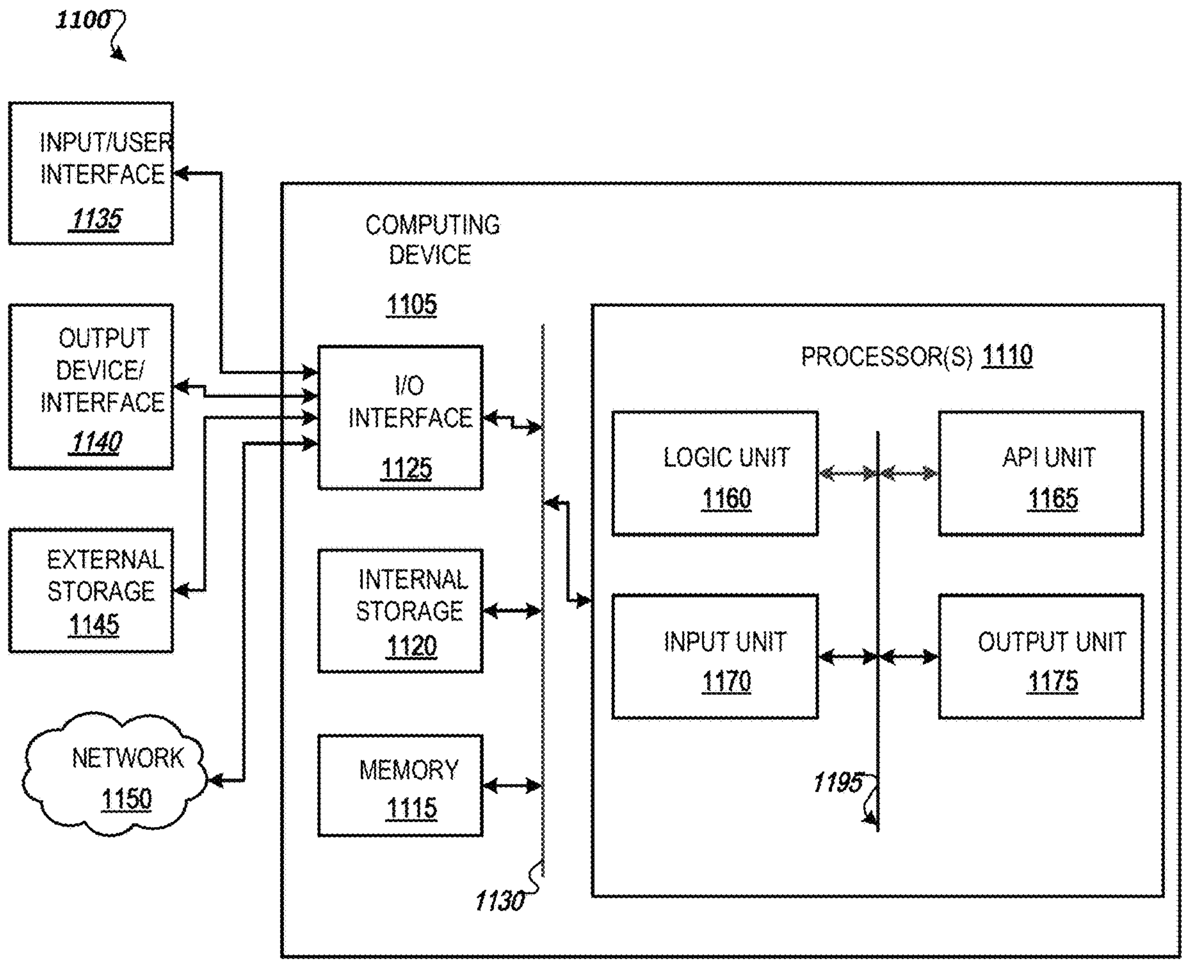
FIG. 11 illustrates an example computing environment with an example computer device suitable for use in some example implementations.

FIG. 11 illustrates an example computing environment with an example computer device suitable for use in some example implementations, such as the management apparatus 1022 to facilitate the implementations of the blockchains and other systems described herein. Computer device 1105 in computing environment 1100 can include one or more processing units, cores, or processors 1110, memory 1115 (e.g., RAM, ROM, and/or the like), internal storage 1120 (e.g., magnetic, optical, solid state storage, and/or organic), and/or I/O interface 1125, any of which can be coupled on a communication mechanism or bus 1130 for communicating information or embedded in the computer device 1105. I/O interface 1125 is also configured to receive images from cameras or provide images to projectors or displays, depending on the desired implementation.

Computer device 1105 can be communicatively coupled to input/user interface 1135 and output device/interface 1140. Either one or both of input/user interface 1135 and output device/interface 1140 can be a wired or wireless interface and can be detachable. Input/user interface 1135 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1140 may include a display, television, monitor, printer, speaker, braille, or the like. In some example implementations, input/user interface 1135 and output device/interface 1140 can be embedded with or physically coupled to the computer device 1105. In other example implementations, other computer devices may function as or provide the functions of input/user interface 1135 and output device/interface 1140 for a computer device 1105.

Examples of computer device 1105 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1105 can be communicatively coupled (e.g., via I/O interface 1125) to external storage 1145 and network 1150 for communicating with any number of networked components, devices, and systems, including one or more computer devices of the same or different configuration. Computer device 1105 or any connected computer device can be functioning as, providing services of, or referred to as a server, client, thin server, general machine, special-purpose machine, or another label.

I/O interface 1125 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1100. Network 1150 can be any network or combination of networks (e.g., the Internet, local area network, wide area network, a telephonic network, a cellular network, satellite network, and the like).

Computer device 1105 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1105 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1110 can execute under any operating system (OS) (not shown), in a native or virtual environment. One or more applications can be deployed that include logic unit 1160, application programming interface (API) unit 1165, input unit 1170, output unit 1175, and inter-unit communication mechanism 1195 for the different units to communicate with each other, with the OS, and with other applications (not shown). The described units and elements can be varied in design, function, configuration, or implementation and are not limited to the descriptions provided. Processor(s) 1110 can be in the form of hardware processors such as central processing units (CPUs) or in a combination of hardware and software units.

In some example implementations, when information or an execution instruction is received by API unit 1165, it may be communicated to one or more other units (e.g., logic unit 1160, input unit 1170, output unit 1175). In some instances, logic unit 1160 may be configured to control the information flow among the units and direct the services provided by API unit 1165, input unit 1170, output unit 1175, in some example implementations described above. For example, the flow of one or more processes or implementations may be controlled by logic unit 1160 alone or in conjunction with API unit 1165. The input unit 1170 may be configured to obtain input for the calculations described in the example implementations, and the output unit 1175 may be configured to provide output based on the calculations described in example implementations.

The computer device 1105 can facilitate functionality for a first blockchain system BC1 directed to representation of fractional ownership of asset baskets via NFT, each of the asset baskets comprising a disposal well configured to generate electricity; and a second blockchain system BC2 directed to operations of the asset baskets, the second blockchain system representing the operations of the asset baskets as operation value tokens as illustrated herein.

For a smart contract executed for an operation for one of the asset baskets, processor(s) 1110 can be configured to instruct the one of the asset basket to execute the operation according to the smart contracts (e.g., instruct a disposal well to start producing electricity); intake sensor data from the asset basket to verify execution of the operation (e.g., field sensor fusion 201, and as shown in FIG. 3); and for verification of the execution of the operation, generating an operation value token realized as fungible token for one of the asset basket in the second blockchain system BC2; and updating a valuation of the fractional ownership of the one of the asset baskets on the first blockchain system.

Depending on the desired implementation, the smart contract can be for an investment proposal, wherein terms of the smart contract are generated by a trusted generative artificial intelligence (AI) 220 configured to intake data from the first and second blockchain.

Processor(s) 1110 can be further configured to execute the method and instructions above, and further include generating the asset baskets, the generating the asset baskets including, for each of the asset baskets adding assets and contracted services to the each of the asset basket; selecting a soul bound asset (SBA) from the assets and contracted services; configuring sensor fusion across the assets in the each of the asset basket; obtaining, from the first blockchain system, data for the assets and contracted services for the each of the asset baskets; validating identity of each of the asset baskets by the soul bound asset; and constructing track and trace pathways for the each of the asset basket as illustrated and described with respect to FIG. 3.

Processor(s) 1110 can be configured to execute the method and instructions as described herein, wherein constructing the track and trace pathways for the each of the asset basket includes establishing a first blockchain consortium of partners in the first blockchain system for the track and trace pathways according to fractional ownership in the first blockchain system; establishing a second blockchain consortium of partners in the second blockchain system for the operations of the each asset basket; and communicatively connected the first blockchain consortium and the second blockchain consortium through the first blockchain system and the second blockchain system as illustrated in FIG. 4.

Processor(s) 1110 can be configured to execute the method and instructions as described herein, and further involve, for a transfer of a fractional ownership of an asset basket from the asset baskets: obtaining, for the asset basket, operations information and asset basket information from the first blockchain system and the second blockchain system; generating, from a generative artificial intelligence (AI) system, project valuations for the asset basket from the operations information and the asset information and smart contracts as operations contracts for investment proposal to parties receiving the fractional ownership of the asset basket; and generating fractional ownership non-fungible tokens (NFTs) to the parties receiving the fractional ownership of the asset basket based on the project valuations and smart contracts proposal generated from the generative AI for the parties as illustrated in FIG. 5.

Processor(s) 1110 can be configured to execute the method and instructions as described herein, and further involve providing a prompt configured to take in input associated with the smart contract and return analysis on the smart contract based on execution of a generative artificial intelligence (AI) system configured to intake information associated with the operation and multimodal data from the first blockchain and the second blockchain, and execute filtering on output according to ownership privileges associated with a fractional ownership NFT, and providing a response based on the filtered output as illustrated in FIGS. 8A to 9B.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as “processing,” “computing,” “calculating,” “determining,” “displaying,” or the like, can include the actions and processes of a computer system or other information processing device that manipulates and transforms data represented as physical (electronic) quantities within the computer system’s registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a system comprising a first blockchain system directed to representation of fractional ownership of asset baskets via NFT, each of the asset baskets comprising a disposal well configured to generate electricity; and a second blockchain system directed to operations of the asset baskets, the second blockchain system representing the operations of the asset baskets as operation value tokens, the method comprising:

for a smart contract executed for an operation for one of the asset baskets:

instructing the one of the asset basket to execute the operation according to the smart contracts;

intaking sensor data from the asset basket to verify execution of the operation; and for verification of the execution of the operation, generating an operation value token realized as fungible token for the one of the asset basket in the second blockchain system; and updating a valuation of the fractional ownership of the one of the asset baskets on the first blockchain system, wherein the disposal well comprises a turbine configured to generate electricity from water disposal operations, and wherein the sensor data comprises electricity generation measurements from the turbine that are transmitted to the second blockchain system to verify the operation and trigger the generating of the operation value token.

2. The method of claim 1, wherein the smart contract is for an investment proposal, wherein terms of the smart contract are generated by a trusted generative artificial intelligence (AI) configured to intake data from the first and second blockchain.

3. The method of claim 1, further comprising generating the asset baskets, the generating the asset baskets comprising, for each of the asset baskets:

adding assets and contracted services to the each of the asset basket;

selecting a soul bound asset (SBA) from the assets and contracted services;

configuring sensor fusion across the assets in the each of the asset basket;

obtaining, from a first block chain system, data for the assets and contracted services for the each of the asset baskets;

validating the each of the asset baskets by the soul bound asset; and constructing track and trace pathways for the each of the asset basket.

4. The method of claim 3, wherein the constructing the track and trace pathways for the each of the asset basket comprises:

establishing a first blockchain consortium of partners in the first blockchain system for the track and trace pathways according to fractional ownership in the first blockchain system;

establishing a second blockchain consortium of partners in the second blockchain system for the operations of the each asset basket; and communicatively connected the first blockchain consortium and the second blockchain consortium through the first blockchain system and the second blockchain system.

5. The method of claim 1, further comprising, for a transfer of a fractional ownership of an asset basket from the asset baskets:

obtaining, for the asset basket, operations information and asset basket information from the first blockchain system and the second blockchain system;

generating, from a generative artificial intelligence (AI) system, project valuations for the asset basket from the operations information and the asset information and smart contracts as operations contracts as investment proposal to parties receiving the fractional ownership of the asset basket; and generating fractional ownership non-fungible tokens (NFTs) to the parties receiving the fractional ownership of the asset basket based on the project valuations and smart contracts proposal generated from the generative AI for the parties.

6. The method of claim 1, further comprising, providing a prompt configured to take in input associated with the smart contract and return analysis on the smart contract based on execution of a generative artificial intelligence (AI) system configured to intake information associated with the operation and multimodal data from the first blockchain and the second blockchain, and execute filtering on output according to ownership privileges associated with a fractional ownership NFT, and providing a response based on the filtered output.

7. The method of claim 1, wherein the disposal well comprises a depleted oil or a gas well having a depth that is repurposed for pumped storage hydropower generation.

8. The method of claim 1, further comprising collecting water from a plurality of oil wells and transporting the water to the disposal well, wherein the turbine is engaged when the water is released to produce electricity from potential energy of the water.

9. The method of claim 1, wherein the intaking sensor data comprises configuring a sensor fusion system from industrial systems for obtaining single truth of operations on the second blockchain system.

10. The method of claim 1, wherein the sensor data is obtained from a management apparatus communicatively coupled to a plurality of disposal wells through a network, the management apparatus managing a database containing historical data collected from sensor systems of each of the disposal wells.

11. The method of claim 1, wherein the sensor data comprises data from at least one of voltmeters, global positioning satellite (GPS) sensors, thermometers, or humidity gauges installed in the disposal well.

12. The method of claim 1, wherein the operation value token comprises a green energy token configured as carbon credits by fractional owners.

13. The method of claim 1, wherein the generating the operation value token is triggered upon settlement of green electricity generation or sale of electricity to a grid.

14. The method of claim 1, wherein the asset basket further comprises at least one of a grid equipment, a battery storage, or a well equipment in addition to the disposal well.

15. A non-transitory computer readable medium, storing instructions for a system comprising a first blockchain system directed to representation of fractional ownership of asset baskets via NFT, each of the asset baskets comprising a disposal well configured to generate electricity; and a second blockchain system directed to operations of the asset baskets, the second blockchain system representing the operations of the asset baskets as operation value tokens, the instructions comprising:

for a smart contract executed for an operation for one of the asset baskets:

instructing the one of the asset basket to execute the operation according to the smart contracts;

intaking sensor data from the asset basket to verify execution of the operation; and for verification of the execution of the operation, generating an operation value token realized as fungible token for the one of the asset basket in the second blockchain system; and updating a valuation of the fractional ownership of the one of the asset baskets on the first blockchain system, wherein the disposal well comprises a turbine configured to generate electricity from water disposal operations, and wherein the sensor data comprises electricity generation measurements from the turbine that are transmitted to the second blockchain system to verify the operation and trigger the generating of the operation value token.

16. The non-transitory computer readable medium of claim 15, wherein the smart contract is for an investment proposal, wherein terms of the smart contract are generated by a trusted generative artificial intelligence (AI) configured to intake data from the first and second blockchain.

17. The non-transitory computer readable medium of claim 15, further comprising generating the asset baskets, the generating the asset baskets comprising, for each of the asset baskets:

adding assets and contracted services to the each of the asset basket;

selecting a soul bound asset (SBA) from the assets and contracted services;

configuring sensor fusion across the assets in the each of the asset basket;

obtaining, from a first block chain system, data for the assets and contracted services for the each of the asset baskets;

validating the each of the asset baskets by the soul bound asset; and constructing track and trace pathways for the each of the asset basket.

18. The non-transitory computer readable medium of claim 17, wherein the constructing the track and trace pathways for the each of the asset basket comprises:

establishing a first blockchain consortium of partners in the first blockchain system for the track and trace pathways according to fractional ownership in the first blockchain system;

establishing a second blockchain consortium of partners in the second blockchain system for the operations of the each asset basket; and communicatively connected the first blockchain consortium and the second blockchain consortium through the first blockchain system and the second blockchain system.

19. The non-transitory computer readable medium of claim 15, the instructions further comprising, for a transfer of a fractional ownership of an asset basket from the asset baskets:

obtaining, for the asset basket, operations information and asset basket information from the first blockchain system and the second blockchain system;

generating, from a generative artificial intelligence (AI) system, project valuations for the asset basket from the operations information and the asset information and smart contracts as operations contracts as investment proposal to parties receiving the fractional ownership of the asset basket; and generating fractional ownership non-fungible tokens (NFTs) to the parties receiving the fractional ownership of the asset basket based on the project valuations and smart contracts proposal generated from the generative AI for the parties.

20. The non-transitory computer readable medium of claim 15, the instructions further comprising providing a prompt configured to take in input associated with the smart contract and return analysis on the smart contract based on execution of a generative artificial intelligence (AI) system configured to intake information associated with the operation and multimodal data from the first blockchain and the second blockchain, and execute filtering on output according to ownership privileges associated with a fractional ownership NFT, and providing a response based on the filtered output.

* * * * *